United States Patent
Rieder et al.

(10) Patent No.: US 8,515,691 B2
(45) Date of Patent: Aug. 20, 2013

(54) METHOD FOR DETERMINING MEASURING TUBE WALL THICKNESS OF A CORIOLIS, FLOW MEASURING DEVICE

(75) Inventors: Alfred Rieder, Landshut (DE); Wolfgang Drahm, Erding (DE); Hao Zhu, Munich (DE); Marcel Braun, Inzlingen (DE)

(73) Assignee: Endress + Hauser Flowtec AG, Reinach (CH)

( * ) Notice: Subject to any disclaimer, the term of this patent is extended or adjusted under 35 U.S.C. 154(b) by 558 days.

(21) Appl. No.: 12/662,821

(22) Filed: May 5, 2010

(65) Prior Publication Data

US 2010/0281999 A1 Nov. 11, 2010

Related U.S. Application Data

(60) Provisional application No. 61/213,146, filed on May 11, 2009.

(30) Foreign Application Priority Data

May 8, 2009 (DE) .......................... 10 2009 002 942

(51) Int. Cl.
*G01L 5/00* (2006.01)
(52) U.S. Cl.
USPC .......................................................... 702/41
(58) Field of Classification Search
USPC .......................................................... 702/41
See application file for complete search history.

(56) References Cited

U.S. PATENT DOCUMENTS 7,716,995 B2 * 5/2010 Patten et al. ............. 73/861.355
7,904,268 B2 * 3/2011 Wheeler et al. ............... 702/100

FOREIGN PATENT DOCUMENTS

| DE | 695 05 808 T2 | 4/1999 |
|---|---|---|
| DE | 103 04 270 A1 | 8/2004 |
| DE | 10 2007 061 585 A1 | 6/2008 |
| EP | 2196780 | 11/2009 |
| WO | 99/39164 | 8/1999 |
| WO | 2006/104485 | 10/2006 |
| WO | 2007/045539 | 4/2007 |

OTHER PUBLICATIONS

R. Cheesewright, Uncertainties Associated with Finite Element Modelling of Coriolis Mass Flow Meters, ScienceDirect, May 8, 2006.
English Translation of International Report on Patentability in corresponding International Application PCT/EP2010/055428.

* cited by examiner

*Primary Examiner* — Aditya Bhat
(74) *Attorney, Agent, or Firm* — Bacon & Thomas, PLLC

(57) ABSTRACT

A method for determining tube wall thickness of at least one measuring tube of a Coriolis, flow measuring device, wherein the Coriolis, flow measuring device has an oscillatory system, which includes at least one measuring tube, and at least one exciter, by which the oscillatory system is excitable to execute mechanical oscillations. In the method, at least one excitation input variable of the at least one exciter and at least one response variable of oscillations of the oscillatory system caused thereby are registered. Additionally, a tube wall thickness of the at least one measuring tube is ascertained by inserting the excitation input variable and the response variable into a transfer equation.

15 Claims, 3 Drawing Sheets

METHOD FOR DETERMINING MEASURING TUBE WALL THICKNESS OF A CORIOLIS, FLOW MEASURING DEVICE

CROSS-REFERENCE TO RELATED APPLICATION

This application is a Nonprovisional which claims the benefit of U.S. Provisional Application No. 61/213,146 filed on May 11, 2009.

TECHNICAL FIELD

The present invention relates to a method for determining tube wall thickness of at least one measuring tube of a Coriolis, flow measuring device, wherein the Coriolis, flow measuring device includes an oscillatory system having at least one measuring tube and at least one exciter, by which the oscillatory system can be excited to execute mechanical oscillations.

BACKGROUND DISCUSSION

According to the Coriolis principle, when in a system a rotating mass movement and a straight line mass movement extending, at least partially, perpendicularly to the rotational axis, superimpose, there then acts on the moved mass an additional force, which is referred to as the Coriolis force. This effect is utilized in a known manner in Coriolis, flow measuring devices, for example, for ascertaining the mass flow of a fluid flowing in a pipeline. Coriolis, flow measuring devices have, as a rule, one or more measuring tubes, wherein these can, depending on type of device, be embodied in various configurations. The system of the at least one measuring tube forms an oscillatory system, which, depending on measuring tube configuration, has corresponding natural oscillation modes, such as, for example, bending oscillations (fundamental mode as well as modes of higher order), torsional oscillations (fundamental mode as well as modes of higher order), etc.

A Coriolis, flow measuring device is, in use, applied in a pipeline, through which a fluid flows, in such a manner, that the fluid flows through the at least one measuring tube. The fluid is, in such case, preferably formed by a liquid, which, depending on application, can have different viscosities, and, in given cases, can also entrain solid and/or gas inclusions. For determining a mass flow of the fluid, the at least one measuring tube is excited by at least one exciter to execute oscillations. The at least one exciter can be, in such case, for example, an electromechanical exciter, especially an electrodynamic exciter, which exerts on the measuring tube of concern a force corresponding to an applied voltage. As a rule, the oscillatory system is excited to its resonance frequency, for example, the fundamental mode of the bending oscillation. If fluid is not flowing through the at least one measuring tube, then the entire measuring tube oscillates in phase. If fluid is flowing through the at least one measuring tube, then a Coriolis force acts on the moved mass (the fluid). This leads to the fact that the measuring tube is supplementally deformed due to the Coriolis force and a phase shift occurs in the length direction of the measuring tube. The phase shift along a measuring tube can be registered by corresponding oscillation sensors, which, in turn, can be formed by electromechanical, especially electrodynamic, sensors arranged spaced from one another along the direction of elongation of the measuring tube. The phase shift, which is registerable via the oscillation sensors, is proportional to the mass flow through the measuring tube.

Additionally, or alternatively, also other physical, measured variables can be ascertained by Coriolis, flow measuring devices, such as, for example, a density, or a viscosity, of a fluid flowing in a pipeline. In the case of the density measurement, the principle is utilized, that the resonance frequency (for example, the fundamental mode of the bending oscillation) depends on the oscillating mass and therewith, on the density of the fluid flowing through the at least one measuring tube. By feedback control of the excitation frequency in such a manner that the oscillatory system is excited in its resonance frequency, the resonance frequency can be ascertained and therefrom, in turn, the density of the flowing fluid.

In the case of mass flow measurement as well as also generally in the case of measuring a physical, measured variable of a flowing fluid by a Coriolis, flow measuring device, in each case, from at least one registered variable, such as, for example, at least one sensor voltage, and, in given cases, additional variables, the physical, measured variable to be ascertained, such as, for example, a mass flow, a density, a viscosity, etc., of the flowing fluid is calculated. Entering in these calculations are, among other things, device-specific factors ascertained, for example, earlier in the context of a calibration. Such device-specific factors can, however, change over time. Especially, occurring in the case of many applications of Coriolis, flow measuring devices over time are wear, corrosion and/or accreting of the at least one measuring tube. The accompanying changes of the oscillatory behavior of the at least one measuring tube bring about measurement error in the measuring of a physical, measured variable of a flowing fluid, especially in the case of mass flow measurement. Desirable, in such case, is that such wear, corrosion and/or accreting of the at least one measuring tube can be detected, without there being required, for this, a deinstallation of the Coriolis, flow measuring device or some other substantial disruption.

In the publication WO 2005/050145 A1, a method for confirming the validity of a flow calibration factor of a flow measuring device is described, in the case of which a beginning bending stiffness and a current bending stiffness of a component, especially of a measuring tube, of the flow measuring device are ascertained. The beginning bending stiffness and the current bending stiffness are compared with one another and based on this comparison, a calibration error is registered. In such case, different ways of determining bending stiffness are explained.

Additionally, in the publication WO 2007/040468 A1, a method for determining a stiffness parameter of a flow measuring device is described, in the case of which an oscillation response behavior at a resonance frequency of the flow measuring device is registered. Additionally, a response voltage and an excitation electrical current with reference to oscillation response behavior, as well as a decay behavior of the flow measuring device, are registered. From these variables, then the stiffness parameter is ascertained.

SUMMARY OF THE INVENTION

An object of the present invention is to provide a method, as well as a Coriolis, flow measuring device, by which wear, corrosion and/or accreting of the at least one measuring tube can be reliably detected, without that, for this, a deinstallation of the Coriolis, flow measuring device or some other substantial disruption being required.

The object is achieved by a method for determining a tube wall thickness of the at least one measuring tube of a Coriolis, flow measuring device, as well as by a Coriolis, flow measuring device.

Provided in the present invention is a method for determining a tube wall thickness of the at least one measuring tube of a Coriolis, flow measuring device. The Coriolis, flow measuring device includes, in such case, an oscillatory system having at least one measuring tube and at least one exciter, by which the oscillatory system can be excited to execute mechanical oscillations. The method includes steps as follows:

A) Registering at least one excitation input variable of the at least one exciter and at least one response variable of oscillations of the oscillatory system caused thereby; and B) determining a tube wall thickness of the at least one measuring tube by inserting the excitation input variable and the response variable into a transfer equation;

wherein, by the transfer equation, among other things, the tube wall thickness of the measuring tube (which affects the bending force acting in the oscillatory system), the excitation input variable and the response variable are related to one another.

In the present invention, thus, by measuring the oscillation response behavior of the oscillatory system and by referencing a transfer equation of the Coriolis, flow measuring device, a tube wall thickness of the at least one measuring tube can be ascertained. Especially, thereby, a change of the tube wall thickness relative to an original tube wall thickness of the measuring tube can be registered. In this way, especially wear, corrosion and/or accreting of the measuring tube leading to a change of the tube wall thickness and therewith to a change of the oscillatory behavior of the oscillatory system, can be registered. For example, an electronics of the Coriolis, flow measuring device can be embodied in such a manner, that in the case of occurrence of a deviation of the tube wall thickness from the original tube wall thickness and/or in the case of exceeding of a predetermined limit value of this deviation, the electronics outputs an error, or alarm, message. Additionally, an electronics of the Coriolis, flow measuring device can be embodied in such a manner that, as a function of the arising deviation, it performs a correction of each flow measurement, in which a physical, measured variable, especially a mass flow, of a flowing fluid is ascertained.

Thus, according to the present invention, wear, corrosion and/or accreting of the at least one measuring tube of the Coriolis, flow measuring device can reliably be detected, without that, for this, a deinstallation of the Coriolis, flow measuring device or of a component of the same is required. Especially, as is explained below with reference to a further development, determining the tube wall thickness can be performed in parallel with a flow measurement performed with the Coriolis, flow measuring device.

In the following, in cases, in which at least one exciter, at least one sensor, at least one measuring tube, at least one excitation input variable, etc. are provided, it is not noted each time explicitly that there is the opportunity for providing a plurality of these components or variables. However, it is pointed out here that such opportunity is to be understood in such circumstances.

By the step of registering at least one excitation input variable of the at least one exciter and at least one response variable of oscillations of the oscillatory system caused thereby, generally, the oscillation response behavior of the oscillatory system in the case of the respective exciting, especially in the case of the respective excitation frequency, is registered. The terminology "excitation input variable" refers, in such case, generally to a variable, which is specific, or characteristic, for the exciting of the oscillatory system (via the at least one exciter). The excitation input variable can, for example, be formed by an excitation voltage or excitation energy applied to the exciter, a excitation electrical current applied to the exciter or by an excitation force exerted by the exciter on the oscillatory system, etc. The terminology "response variable" generally refers to a variable, which is specific, or characteristic, for the oscillatory system oscillations caused by the exciter. The response variable can be formed, for example, by an amplitude of the oscillatory system oscillations caused by the exciter or by a sensor voltage provided by an oscillation sensor, which registers an amplitude and/or velocity of the oscillations of the oscillatory system, etc.

The transfer equation relates, in such case, an excitation input variable and a response variable to one another, so that the oscillation response behavior of a Coriolis, flow measuring device is described by the transfer equation. Depending on which excitation input variable and which response variable are registered, or ascertained, in the Coriolis, flow measuring device, the transfer equation can have different forms. Entering in the transfer equation are properties of the oscillatory system, which influence the oscillatory behavior of the oscillatory system. Especially, the oscillatory behavior is influenced by the bending force of the at least one measuring tube, wherein the tube wall thickness of the at least one measuring tube affects this bending force. Accordingly, the transfer equation can be formulated in such a manner, that the tube wall thickness of the at least one measuring tube is present therein as a variable and the equation can be solved for this tube wall thickness.

The method of the invention is, in such case, basically applicable independently of the number and configuration of the measuring tube, or the measuring tubes, of the Coriolis, flow measuring device. Especially, the measuring tube, or the measuring tubes, can each be straight, curved or bent. Preferably, the step of determining (step B) and, in given cases, also the step of registering (step A) is/are completely or partially performed by a correspondingly embodied electronics (analog and/or digital) of the Coriolis, flow measuring device. Alternatively, these steps (especially step B) can be performed, completely or partially, also by an external data processing unit, to which the corresponding measurement signals, or information, are/is transmitted, for example, via a network system.

In an advantageous, further development, the particular tube wall thickness is compared with an original tube wall thickness of the at least one measuring tube and, in given cases, a deviation of such detected. In this way, wear, corrosion and/or accreting of the measuring tube can be simply and reliably detected. For the reliable detection of wear, corrosion and/or accreting of the measuring tube, (exact) determining of the absolute value of the tube wall thickness is less important. Rather, it is only essential that by the method of the invention a deviation relative to an original value of the tube wall thickness is reliably registerable. Preferably, such a comparison and such a determination are performed (analogy and/or digitally) by a correspondingly embodied electronics of the Coriolis, flow measuring device. If such a deviation is detected and/or such deviation exceeds a predetermined limit value, then this can be displayed (acoustically and/or optically) to a user at the Coriolis, flow measuring device and/or on an external data processing unit, or a corresponding alarm output.

In an advantageous, further development, the transfer equation is formed at least partially by a resonator model with one degree of freedom, which is present up to second order. By such a resonator model, the oscillation response behavior of the oscillatory system of a Coriolis, flow measuring device can be relatively well described.

Preferably, the transfer equation includes the following Equation (1) at least as a component:

$$\frac{F_D}{X_S} = ah \left| 1 + \frac{s}{\omega_0 Q} + \frac{s^2}{\omega_0^2} \right| \quad (1)$$

wherein:
$F_D$ is an excitation input variable in the form of an excitation force exerted by the at least one exciter on the oscillatory system;
$X_S$ is a response variable in the form of an amplitude of the oscillations of the oscillatory system caused by the exciter;
a is a material, and geometry, dependent constant of the at least one measuring tube;
h is the tube wall thickness of the at least one measuring tube;
$\omega_0$ is a resonance frequency of the excited oscillation mode;
Q is a quality factor, which describes the decay behavior of the oscillations of the oscillatory system in the case of a one time exciting; and
$s=i\omega$, wherein $\omega$ corresponds to an excitation frequency of the oscillatory system.

The reciprocal of the product of a and h forms, in such case, a measure of the flexibility of the at least one measuring tube.

Equation (1) is true basically in the case of an oscillatory system, which has one or also a number of measuring tubes. Depending on configuration and number of the measuring tubes, especially the material, and geometry, dependent constant a will have a different value.

In an advantageous, further development, for the step of registering, the oscillatory system is excited at an excitation frequency by the at least one exciter and the excitation input variable associated with this excitation frequency as well as the response variable of the oscillatory system occurring at this excitation frequency are registered. Accordingly, for determining a tube wall thickness, only the exciting at an excitation frequency as well as the registering the excitation input variable and the response variable of the oscillatory system at this excitation frequency are required. Compared to a broadband exciting at a plurality of frequencies and a frequency dependent registering of the excitation input variable and the response variable of the oscillatory system, thus, the effort required for the evaluation is reduced.

The excitation frequency, which is taken into consideration for determining tube wall thickness, can, in such case, be the excitation frequency, which is used for a flow measurement for determining a physical, measured variable of a flowing fluid (in the following: flow measurement, excitation frequency). The excitation frequency can, however, also deviate from the flow measurement, excitation frequency. Especially, the oscillatory system can be excited in parallel with at least two frequencies, namely the excitation frequency (for determining tube wall thickness) and the flow measurement, excitation frequency. The flow measurement and the method for determining tube wall thickness can, in the latter case, be performed in parallel. Experimentally, for example, good results have been achieved, when the excitation frequency (for determining tube wall thickness) lies slightly (for example, around 10% of the flow measurement, excitation frequency) higher or, in given cases, also lower than the flow measurement, excitation frequency. Frequently, the flow measurement, excitation frequency is, in such case, tuned in such a manner, that it corresponds to the resonance frequency of an excited oscillation mode. As a rule, for the flow measurement for determining a physical, measured variable, the fundamental mode of the bending oscillation is excited, this also being referred to as the first, symmetric mode of the bending oscillation.

In an advantageous, further development, the excitation frequency corresponds to the resonance frequency of an excited oscillation mode, especially the fundamental mode of a bending oscillation. In this case, the above transfer equation set forth in Equation (1) simplifies to:

$$h = \frac{Q F_D}{a X_S} \quad (2)$$

where the variables h, $F_D$, Q, $X_S$ and a are as defined above with respect to Equation (1). In an advantageous, further development, it is provided that the transfer equation contains Equation (2) as a component. Compared to Equation (1), thus, determining the tube wall thickness h is simpler. Additionally, in the case of this further development, the exciting for determining the tube wall thickness can occur at the same frequency, as it occurs, as a rule, also for determining a physical, measured variable in the context of a flow measurement.

In an advantageous, further development, the excitation frequency deviates from the resonance frequency of an excited oscillation mode, especially the fundamental mode of a bending oscillation. In the case of such an exciting, in many applications, the term $$\frac{i\omega}{\omega_0 Q}$$

in Equation 1 can be neglected, so that the following equation is obtained:

$$h = \frac{F_D}{a X_S \left(1 - \frac{\omega^2}{\omega_0^2}\right)} \quad (3)$$

where the variables h, $F_D$, $X_S$, a, $\omega$ and $\omega_0$ are, in such case, as defined above with respect to Equation (1). The obtained approximation is especially possible, when the quality factor Q is sufficiently large and also the ratio $$\frac{\omega}{\omega_0}$$

is sufficiently large, so that the magnitude of $$\frac{i\omega}{\omega_0 Q}$$

relative to the magnitude of $$\frac{\omega^2}{\omega_0^2}$$

is small. The quality factor Q depends, in such case, on the particular fluid to be measured. Experimentally, it has been found, that the quality factor Q in the case of most applications is sufficiently large and accordingly the term $$\frac{i\omega}{\omega_0 Q}$$

in Equation (1) can be neglected. Additionally, it has been found experimentally, that an excitation frequency ω, which is slightly (for example, around 10%) higher than the resonance frequency $\omega_0$ of the excited oscillation mode, is well suited.

In an advantageous, further development, the transfer equation includes Equation (3) as a component. This further development is especially advantageous, since, by the achieved approximation, determining the quality factor Q can be omitted. The determining of the quality factor Q is, thus, connected with supplemental measuring effort.

With reference to further developments, it has been indicated above that the transfer equation can contain Equation (1), (2) or (3) "as a component". In such case, it is not absolutely required, that Equation (1), (2) or (3) be contained identically in the transfer equation or forms this transfer equation. Rather, the applied transfer equation can also have one of the equations (1), (2) or (3) in form rearranged or supplemented in such a manner, that by the transfer equation a relationship is produced for another excitation input variable than the excitation force $F_D$ and/or for another response variable than the amplitude $X_S$ of the caused oscillations. Between which excitation input variable and response variable the applied transfer equation provides a relationship can, for example, be chosen as a function of which excitation input variable and which response variable are registerable simply in the Coriolis, flow measuring device.

In an advantageous, further development, $F_D$ is obtained via the following Equation (4):

$$F_D = e_D I_D \qquad (4)$$

wherein:

$I_D$ is an excitation electrical current of the at least one exciter, and $e_D$ is an exciter efficiency, which gives a ratio between the excitation force $F_D$, which is exerted by the at least one exciter on the oscillatory system, and the excitation electrical current $I_D$. The exciter efficiency $e_D$ is, in such case, a device-specific constant. The excitation electrical current $I_D$ can in many applications be registered more easily than the excitation force $F_D$. Accordingly, in the equations (1), (2) and (3), the excitation force $F_D$ can, in each case, be replaced by the product of the exciter efficiency $e_D$ and the excitation electrical current $I_D$.

In an advantageous, further development, the resonance frequency of the excited oscillation mode is ascertainable by solving a homogeneous differential equation containing forces acting on the oscillatory system, especially a force bending the at least one measuring tube, an inertial force and a Coriolis force. Especially, the resonance frequency $\omega_0$, which is obtained by solving the homogeneous differential equation, is representable by the following Equation (5):

$$\omega_0 = \sqrt{\frac{ah}{A_M \rho_M + A_F \rho_F}}$$

wherein:

$A_M$ is the cross sectional area of the at least one measuring tube;

$\rho_M$ is the density of the material of the at least one measuring tube;

$A_F$ is the cross sectional area of a fluid flowing in the at least one measuring tube, and $\rho_F$ is the density of the fluid flowing in the at least one measuring tube.

The cross sectional area is, in such case, in each case, measured perpendicular to the flow direction of the particular fluid, or perpendicular to the direction of elongation of the measuring tube. As indicated above, the reciprocal value of the product of a and h is a measure of the flexibility of the at least one measuring tube.

In an advantageous, further development, the method of the invention (in given cases, according to one of the above explained, further developments) is performed in parallel with a flow measurement performed with the Coriolis, flow measuring device, in which a physical, measured variable, especially a mass flow, a viscosity and/or a density of a fluid flowing through at least one measuring tube is ascertained. An advantage, in such case, is that a flow measurement does not need to be interrupted for determining the tube wall thickness.

In an advantageous, further development, the method of the invention is performed (in given cases, according to one of the above explained, further developments) in a state, in which the at least one measuring tube is empty. In the case of an empty measuring tube, an advantage is that then a higher accuracy of measurement is achievable in the determining the tube wall thickness. This further development is especially advantageous, when an inhomogeneous fluid flows through the at least one measuring tube during a flow measurement.

In an advantageous, further development, in the step of determining the tube wall thickness of the at least one measuring tube, a temperature compensation and/or a pressure compensation are/is performed. Especially, the above set forth, material, and geometry, dependent constant a as well as the exciter efficiency $e_D$ are temperature dependent. In reference to the preventing of errors due to the temperature dependence of these parameters, a temperature compensation is advantageous in the case of at least these two parameters. To the extent that high pressures (especially of the fluid within the measuring tube) occur, the material, and geometry, dependent constant a, into which the average radius $r_a$ of the measuring tube enters, can likewise show a pressure dependence to be taken into consideration. In order to prevent an error due to the pressure dependence of the constant a, a pressure compensation of this constant is advantageous.

The present invention relates, additionally, to a Coriolis, flow measuring device, which has an oscillatory system including: At least one measuring tube, at least one exciter, by which the oscillatory system can be excited to execute mechanical oscillations, and at least one oscillation sensor, by which mechanical oscillations of the oscillatory system are registerable. An electronics of the Coriolis, flow measuring device is, in such case, embodied in such a manner, that the electronics can register, via corresponding sensors, at least one excitation input variable of the at least one exciter and at least one response variable of oscillations of the oscillatory system caused thereby and that the electronics can, by inserting the excitation input variable and the response variable into a transfer equation, ascertain a tube wall thickness of the at least one measuring tube. The transfer equation interrelates, in such case, among other things, the tube wall thickness of the measuring tube (the tube wall thickness affects a bending force arising on the oscillatory system), the excitation input variable and the response variable.

In such case, it is not absolutely required, that sensors be provided for registering the excitation input variable. Rather, the excitation input variable can be ascertained also on the basis of a control signal output by the electronics of the Coriolis, flow measuring device to the at least one exciter.

The advantages explained above in reference to the method of the invention are achieved in corresponding manner by the Coriolis, flow measuring device of the invention. In the case of the Coriolis, flow measuring device of the invention, the same further developments, which were explained above in reference to the method of the invention, are implementable in corresponding manner.

BRIEF DESCRIPTION OF THE DRAWINGS

Other advantages and utilities of the invention will become evident on the basis of the subsequent description of examples of embodiments with reference to the appended drawing, the figures of which show as follows.

DETAILED DISCUSSION IN CONJUNCTION WITH THE DRAWINGS

Figure 1:
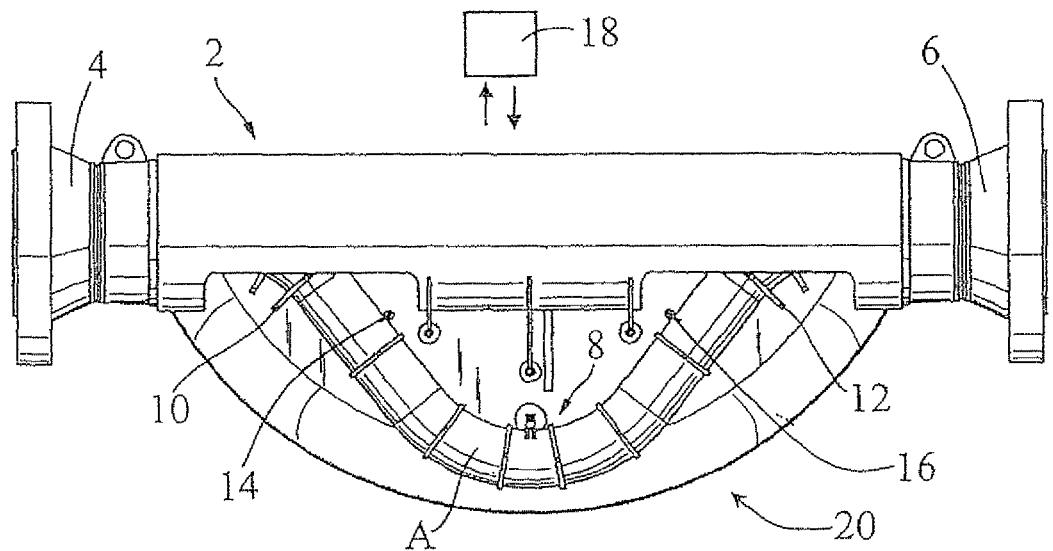
FIG. 1 shows by way of example, an illustration of a Coriolis, flow measuring device having two measuring tubes, in side view with partially removed housing.
Figure 2:
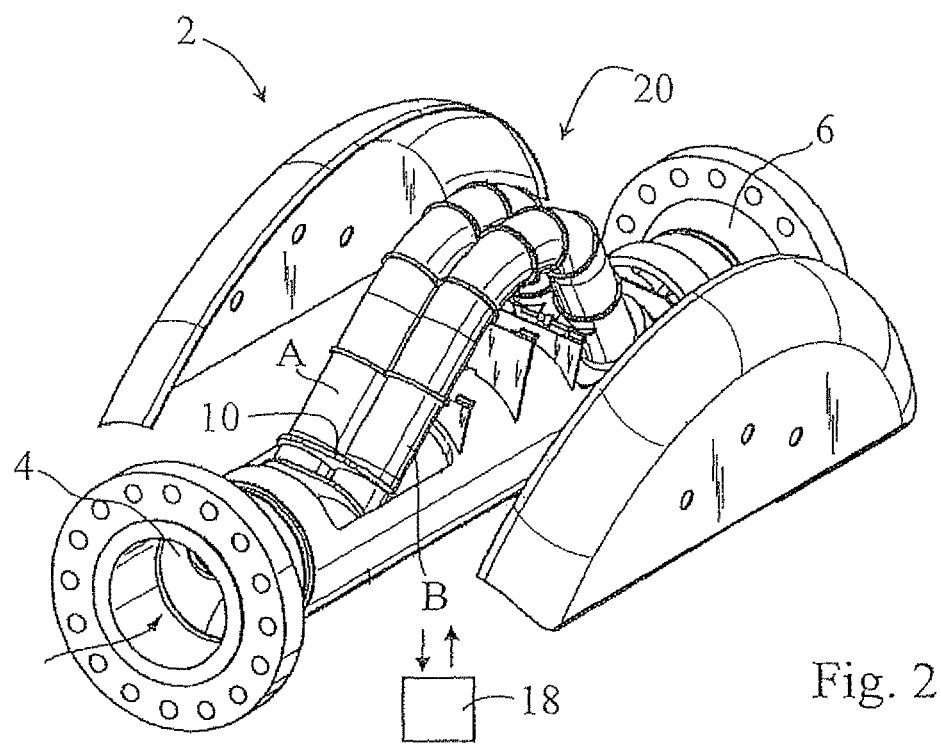
FIG. 2 shows the Coriolis, flow measuring device of FIG. 1, in perspective view with partially removed housing.

FIGS. 1 and 2 show, for example, a Coriolis, flow measuring device 2 suitable for application of the present invention. The Coriolis, flow measuring device 2 includes two oscillatably held, measuring tubes A and B, both of which are curved and extend in parallel with one another. The Coriolis, flow measuring device 2 is, in such case, installed in a pipeline (not shown) in such a manner, that the fluid flowing in the pipeline flows through both measuring tubes A and B. For this, the Coriolis, flow measuring device 2 includes on the input side a flow divider 4, by which the fluid is divided to the two measuring tubes A and B. On the output side in corresponding manner, a flow divider 6 is provided, by which the fluid emerging from the two measuring tubes A and B is guided back together and led to an outlet of the Coriolis, flow measuring device 2.

Extending between the two measuring tubes A and B is an exciter 8, which in the present example of an embodiment is formed by an electrodynamic exciter 8. The exciter 8 is in the present example of an embodiment arranged at a point of reversal of the arc of each of the two measuring tubes A and B. Exciter 8 is embodied in such a manner that by applying an electrical excitation voltage, which forms an excitation input variable, the length of the exciter is changed. By applying a corresponding, periodic electrical excitation voltage to the exciter 8, the two measuring tubes A and B can periodically be pushed apart and/or drawn together, so that they execute bending oscillations. In such case, the two measuring tubes A and B are excited with opposite phase to one another and each executes a swinging movement about a longitudinal axis of the Coriolis, flow measuring device 2. The two measuring tubes A and B are additionally mechanically coupled to one another on the input and output sides by corresponding coupling elements 10, 12.

Between the two measuring tubes A and B, on an inlet side section and on an outlet side section of each, extend two oscillation sensors 14, 16, by way of whose length changes mechanical oscillations of the two measuring tubes A and B are registerable. In the present example of an embodiment, the two oscillation sensors 14, 16 each register separation change between the two measuring tubes A, B, i.e. their combined amplitudes are registered. The oscillation sensors 14, 16 are formed, for example, by electrodynamic sensors. The oscillation sensors 14, 16 output, as a function of the oscillations of the measuring tubes A and B, sensor voltages, which form a response variable of the caused oscillations. For measuring mass flow via the two oscillation sensors 14, 16, among other things, a phase shift of the oscillations of the measuring tubes A, B in the length direction of the two measuring tubes A, B can be registered and therefrom the mass flow calculated.

The exciting of the exciter 8 by applying a corresponding excitation voltage as well as the evaluation of sensor voltage (or, generally, measurement signal) provided by the oscillation sensors 14, 16 occurs by a correspondingly embodied electronics 18, which is presented schematically in FIGS. 1 and 2 by a box. Especially, electronics 18 is embodied in such a manner, that its exciting of the oscillatory system 20, which includes the two measuring tubes A, B, is controllable in such a manner, that the oscillatory system 20 is excited to a resonance frequency of the fundamental mode of the bending oscillation. Such control of the excitation frequency can occur, for example, on the basis of an evaluation of at least one measurement signal of the oscillation sensors 14, 16. Especially, such control can occur in such a manner, that the phase shift between the (periodic) exciting signal, and a (periodic) measurement, signal of at least one of the oscillation sensors 14, 16 (i.e. the phase of the forced oscillation) amounts to 90 deg. Additionally, the electronics is embodied in such a manner, that its exciting of the oscillatory system 20 is controllable such that the oscillatory system 20 oscillates with a constant, combined amplitude. This means that the exciting is controlled in such a manner, that the maximum distance between the two measuring tubes A, B achieved in the executed oscillations is constant (independently of the excitation frequency). In this regard, the excitation input variable, such as, for example, the maximum excitation voltage applied to the exciter 8, must be controlled based on at least one measurement signal of at least one of the oscillation sensors 14, 16, especially based on a sensor voltage. Additionally or alternatively to the above explained controls, the electronics 18 also can be embodied in such a manner that it sets an alternative oscillatory behavior of the oscillatory system 20. For example, also in the case of a constant excitation input variable, the changes of the measurement signal, especially the amplitude of the oscillation, can be analyzed.

In the following, the equations relevant for the present invention will now be explained on the basis of a Coriolis, flow measuring device (not shown), in the case of which the oscillatory system is formed by a single, straight, measuring tube. The forces acting on the measuring tube are the bending force, inertial force, Coriolis force and centrifugal force. Since, as a rule, the oscillation amplitude of the measuring tube is very small compared with its length, the centrifugal force can be neglected. Under the assumption, that this involves an ideal measuring tube, especially that its geometric and physical properties do not change along its direction of elongation, the homogeneous differential equation can be given according to the following Equation (6), wherein the first term is the bending force, the second term the inertial force and the third term the Coriolis force:

$$EI\frac{\partial^4 Y_M}{\partial x^4} + (A_M\rho_M + A_F\rho_F)\frac{\partial^2 Y_M}{\partial t^2} + 2A_F\rho_F u\frac{\partial^2 Y_M}{\partial t\partial x} = 0 \qquad (6)$$

wherein E is the modulus of elasticity (or Young's module) and I is the areal moment of inertia (or axial moment of inertia of second degree) of the measuring tube. $Y_M$ is the deflection of the measuring tube in a direction perpendicular to the direction of elongation of the measuring tube and x is the coordinate along the direction of elongation of the measuring tube. A is, in each case, the cross sectional area (perpendicular to the direction of elongation of the measuring tube) and $\rho$ is the density of the medium (measuring tube and flowing fluid, respectively). In such case, the subscript M refers to the measuring tube and F the fluid flowing in the measuring tube. The letter t is, as usual, time. The letter u stands for the velocity of the flowing fluid (velocity along the direction of elongation of the measuring tube).

For describing the oscillatory behavior of the measuring tube, the boundary conditions are applied, that the measuring tube is fixed at both ends and, thus, on the ends the deflection $Y_M$ of the measuring tube, as well as $$\frac{\partial Y_M}{\partial x}$$

are zero. Additionally, a modal analysis is performed. In reference to an exciting of the measuring tube in the fundamental mode of the bending oscillation, relevant, in such case, are the fundamental mode of the bending oscillation, which is also referred to as the first symmetric mode of the bending oscillation, as well as the second mode of the bending oscillation, which is also referred to as the first antisymmetric mode of the bending oscillation.

Especially, the oscillatory behavior of the measuring tube can be described (approximately) as follows: Fundamentally, as above explained, the measuring tube is excited in the fundamental mode of the bending oscillation and oscillates in this. If a fluid is flowing through the measuring tube, then there is superimposed on the fundamental mode of the bending oscillation the second mode of the bending oscillation. If the deflection $Y_M(x,t)$ is represented as a superpositioning of these two oscillation modes and this applied into the differential equation (Equation 6), then the resonance frequency $\omega_0$ of the fundamental mode of the bending oscillation can be obtained therefrom. The relationship obtained for the resonance frequency $\omega_0$ is given in Equation (7). $\gamma_D$ is, in such case, the mode constant for the fundamental mode of the bending oscillation and l corresponds to the length of the measuring tube. For $\gamma_D$, a value of 2.3650 can be applied.

$$\omega_0 = \sqrt{\frac{EI\left(\frac{2\gamma_D}{l}\right)^4}{A_M\rho_M + A_F\rho_F}} \qquad (7)$$

If for the areal moment of inertia I of the measuring tube, the relationship set forth in Equation (8) is applied, then, for the resonance frequency $\omega_0$, the relationship set forth in Equation (9) is obtained. In such case, $r_a$ is the average radius of the measuring tube and h is the tube wall thickness of the measuring tube.

$$I = hr_a^3\pi \qquad (8)$$

$$\omega_0 = \sqrt{\frac{Ehr_a^3\pi\left(\frac{2\gamma_D}{l}\right)^4}{A_M\rho_M + A_F\rho_F}} \qquad (9)$$

Furthermore, some of the material, and geometry, dependent variables set forth in Equation (9) can be combined to the material, and geometry, dependent constant a, as is given in Equation (10). If this relationship is applied in Equation (9), then Equation (11) is obtained.

$$a = Er_a^3\pi\left(\frac{2\gamma_D}{l}\right)^4 \qquad (10)$$

$$\omega_0 = \sqrt{\frac{ah}{A_M\rho_M + A_F\rho_F}} \qquad (11)$$

On the basis of Equation 11, it is evident, that the tube wall thickness h is a determinative variable for the oscillation characteristics of the measuring tube.

Figure 3:
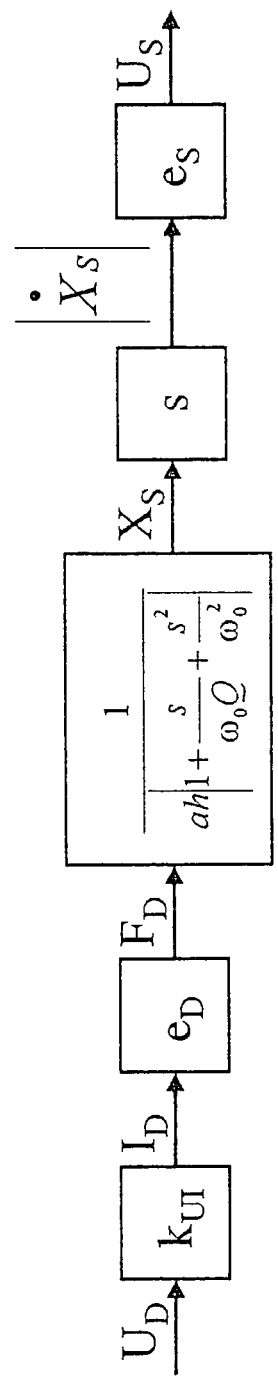
FIG. 3 shows by way of example, a transfer function of a Coriolis, flow measuring device.

FIG. 3 shows, for example, a transfer function of a Coriolis, flow measuring device, which has a straight measuring tube. The transfer function relates, in such case, an excitation voltage $U_D$, which forms an excitation input variable, to a sensor voltage $U_S$, which forms a response variable. The transfer function is true in the case of an exciting with a frequency $\omega=s/i$ ($i^2=-1$) and represents the relationship between different excitation input variables and response variables at this frequency. As graphically presented in FIG. 3, an excitation electrical current $I_D$ is obtained by multiplication of the excitation voltage $U_D$ with the (device-specific) factor $k_{UI}$ and an excitation force $F_D$ by multiplication of the excitation electrical current $I_D$ with the factor $e_D$, which is also referred to as exciter efficiency. In such case, also the excitation electrical current $I_D$ and the excitation force $F_D$ form, in each case, excitation input variables.

By multiplication of the excitation force $F_D$ with the term $$\frac{1}{ah\left|1 + \frac{s}{\omega_0 Q} + \frac{s^2}{\omega_0^2}\right|}$$

set forth in the central box in FIG. 3, the amplitude $X_S$ of the oscillation caused in the case of the frequency $\omega=s/i$ ($i^2=-1$) is obtained. The term set forth in the central box in FIG. 3 is obtained by applying for the oscillation response behavior a resonator model with a degree of freedom up to second order.

In the case of the present form of embodiment, at least one oscillation sensor registers the velocity $|\dot{X}_S|$ of the change of deflection (or of the oscillation) of the oscillation sensor and outputs a sensor voltage $U_S$ corresponding to the velocity. As further presented in FIG. 3 graphically, the velocity of the change of deflection of the sensor is obtained by multiplication of the amplitude $X_S$ with the factor $s=i\omega$ and the sensor voltage $U_S$ by multiplication of the velocity $|\dot{X}_S|$ with the factor eS, which is also referred to as sensor sensitivity. Additionally, as not presented in FIG. 3 in greater detail, the sensor voltage can be processed yet more in the Coriolis, flow measuring device, especially subjected to an AD-conversion and/or amplified. The variables set forth in FIG. 3 to the right of the central box, namely the amplitude $X_S$, the velocity $|\dot{X}_S|$ and the sensor voltage $U_S$ are, in each case, response variables.

If only the term set forth in FIG. 3 in the central box is taken into consideration, in order to provide a relationship between the excitation force $F_D$ and the amplitude $X_S$, then Equation (1) is obtained. As already given above, the transfer equation, which is taken into consideration for determining tube wall thickness h, is, in a form of embodiment, formed exclusively by Equation (1). For determining the tube wall thickness h of the measuring tube, this equation can be solved for h. This relationship is given in the following Equation (12):

$$h = \frac{F_D}{aX_S\left|1 + \frac{s}{\omega_0 Q} + \frac{s^2}{\omega_0^2}\right|} \tag{12}$$

Alternatively, however, as is evident on the basis of the transfer function illustrated in FIG. 3, also the relationship for another excitation input variable and/or for another response variable can be produced. For example, in some Coriolis, flow measuring devices, the electronics is embodied in such a manner, that it makes a damping D ascertainable (s. Equation (13). If the relationships set forth in Equations (4) and (13) are applied in Equation (12), then Equation (14) is obtained.

$$D = \frac{I_D}{X_S} \tag{13}$$

$$h = \frac{e_D D}{a\left|1 + \frac{s}{\omega_0 Q} + \frac{s^2}{\omega_0^2}\right|} \tag{14}$$

As above explained, according to a form of embodiment of the present invention, the oscillatory system is excited at the resonance frequency $\omega_0$ and the response variable associated with this frequency registered. In this way, the equations (12) and (14), respectively, simplify to the relationship set forth in Equation (15), wherein the tube wall thickness h is given once as a function of the damping D and once only as a function of the ratio between the excitation force $F_D$ and the amplitude $X_S$.

$$h = \frac{e_D Q D}{a} = \frac{Q F_D}{a X_S} \tag{15}$$

Q is, in such case, the quality factor. This describes the decay behavior of the oscillation of the oscillatory system after a (one time) exciting of the same. Experimentally, the quality factor Q can be calculated on the basis of the following Equation (16), wherein, for this, the oscillatory system first is excited (with the resonance frequency) and then the excitation interrupted and the decay behavior of the oscillation recorded.

$$Q = \frac{\omega_0(t_2 - t_1)}{2\ln\left(\frac{Y_1}{Y_2}\right)} \tag{16}$$

Figure 4:
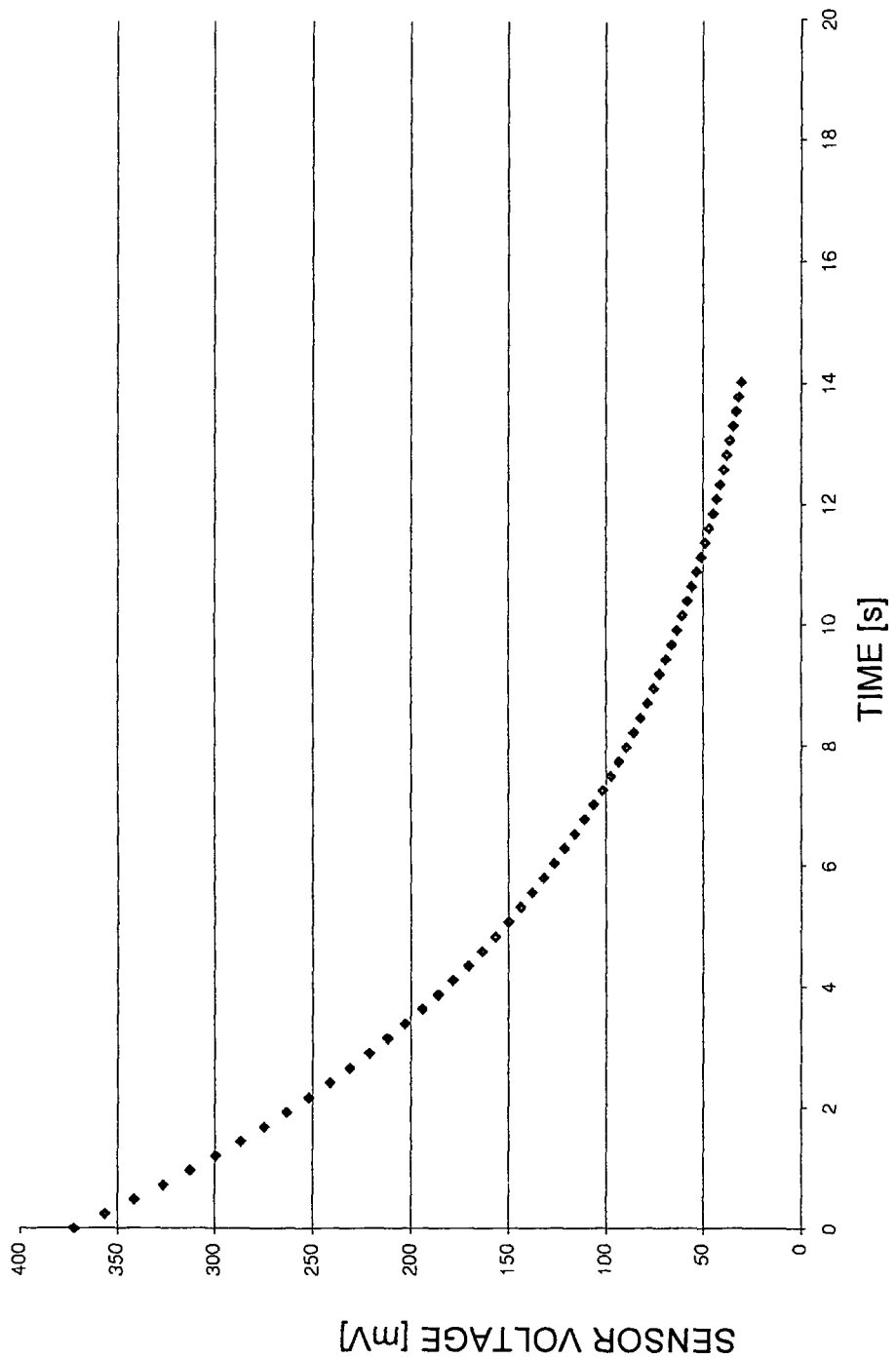
FIG. 4 is a graph illustrating decay behavior of the oscillations of the oscillatory system following a one time exciting of the same.

After interruption of the excitation, the oscillatory system oscillates further, with the amplitude of the oscillation falling with increasing time. As is known in the technical field, in such case, the envelope curve of the oscillation describes the decay behavior of the amplitude of the oscillation. For ascertaining the quality factor Q, for example, the envelope curve, by which the decay behavior of the amplitude of the oscillation is described, is captured by a corresponding measuring. The points in time, $t_1$ and $t_2$ are, in such case, two points in time following one after the other and $Y_1$ and $Y_2$ are, in such case, the amplitudes of the oscillation at these points in time, as obtained, for example, from the envelope curve. FIG. 4 shows, in such case, the sensor voltage, in millivolts, of an oscillation sensor, as recorded after a one time exciting of the oscillatory system at the resonance frequency $\omega_0$, plotted as a function of time, in seconds. From the sensor voltage, which, as explained above, is a measure for the velocity of the change of the deflection of the oscillation sensor, in turn, the associated amplitude of the oscillation can be obtained.

In an alternative form of embodiment of the invention, the excitation frequency, which is taken into consideration for determining tube wall thickness, deviates from the resonance frequency of the fundamental mode of the bending oscillation. In the present example of an embodiment, the excitation frequency ω is slightly, especially around 10%, higher than the resonance frequency $\omega_0$ of the fundamental mode of the bending oscillation. @As already discussed above, in the case of such an exciting, in many applications, in Equation (14) (and correspondingly in Equation (12)), the term $$\frac{s}{\omega_0 Q}$$

can be neglected, so that the below set forth Equation (17) is obtained.

$$h = \frac{F_D}{aX_S\left(1 - \frac{\omega^2}{\omega_0^2}\right)} \tag{17}$$

In the case of this form of embodiment, determining of the quality factor Q can be omitted. Accordingly, no separate measuring is required, in which the decay behavior of the oscillations is captured after a one time exciting. Furthermore, as already explained above, determining the tube wall thickness h of the measuring tube can be performed in parallel with a flow measurement, in the case of which a physical, measured variable of a fluid flowing in a pipeline is ascertained and in the case of which an exciting of the measuring tube at a flow measurement, excitation frequency occurs.

The present invention is not limited to the examples of embodiments explained with reference to the figures. Especially, the equations are explained with reference to an oscillatory system, which has only one, straight, measuring tube and which is excited in the fundamental mode of the bending oscillation. The equations are, however, largely applicable in corresponding manner in the case of other configurations of one or a plurality of measuring tubes as well as also in the case of an exciting of another oscillation mode. However, then the particular constants and variables, especially the material, and geometry, dependent constant a, as well as the resonance frequency $\omega_0$, deviate from the given constants and variables.

Additionally, also the exciting of the measuring tubes to oscillations and the registering of the oscillations of the measuring tubes can occur in different ways. For example, the measuring tubes can also be individually excited and their amplitudes individually registered via corresponding oscillation sensors. Also type and number of the oscillation sensors and exciters used can deviate from the described oscillation sensors and the described exciter.

The invention claimed is:

1. A method for determining tube wall thickness of at least one measuring tube of a Coriolis, flow measuring device, said Coriolis, flow measuring device including an oscillatory system, with at least one measuring tube, and at least one exciter adapted to execute mechanical oscillations, said method comprising:
    registering at least one excitation input variable of the at least one exciter and at least one response variable of oscillations of the oscillatory system caused thereby; and
    determining a tube wall thickness of the at least one measuring tube wherein determining a tube wall thickness includes:
    inserting the excitation input variable and the response variable into a transfer equation,
    said transfer equation relating to one another the tube wall thickness of the measuring tube, which enters into a bending force occurring on the oscillatory system, the excitation input variable and the response variable.

2. The method as claimed in claim 1, further comprising the step of:
    comparing the ascertained tube wall thickness with an original tube wall thickness of the at least one measuring tube and, in given cases, determining a deviation of the same.

3. The method as claimed in claim 1, wherein:
    the transfer equation is formed, at least partially, by a resonator model with a degree of freedom, which is up to second order, especially, that the transfer equation has the component, $$\frac{F_D}{X_S} = ah \left| 1 + \frac{s}{\omega_0 Q} + \frac{s^2}{\omega_0^2} \right|,$$

wherein:
    $F_D$ is an excitation force exerted by the at least one exciter on the oscillatory system and forms an excitation input variable,
    $X_S$ is an amplitude of the oscillations of the oscillatory system caused by the exciter and forms a response variable, a is a material, and geometry, dependent constant of the at least one measuring tube,
    h is the tube wall thickness of the at least one measuring tube,
    $\omega_0$ is a resonance frequency of the particular excited oscillation mode,
    Q is a quality factor, which describes the decay behavior of the oscillations of the oscillatory system in the case of a one time exciting, and
    $s=i\omega$, wherein $\omega$ is an excitation frequency of the oscillatory system, and wherein the reciprocal value of the product of a and h is a measure of flexibility of the at least one measuring tube.

4. The method as claimed in claim 3, wherein:
    $F_D$ is obtained via the equation, $F_D = e_D I_D$, wherein
    $I_D$ is an excitation electrical current of the at least one exciter, and
    $e_D$ an exciter efficiency, which is a ratio between the excitation force, which is exerted by the at least one exciter on the oscillatory system, and the excitation electrical current.

5. The method as claimed in claim 3, wherein:
    the resonance frequency of the excited oscillation mode is ascertainable by solving a homogeneous differential equation, in which forces acting on the oscillatory system, especially a bending force of the at least one measuring tube, an inertial force and a Coriolis force, are applied.

6. The method as claimed in claim 5, wherein:
    the resonance frequency is ascertainable on the basis of the following equation:

$$\omega_0 = \sqrt{\frac{ah}{A_M \rho_M + A_F \rho_F}},$$

wherein
    $A_M$ is the cross sectional area of the at least one measuring tube,
    $\rho_m$ is the density of the material of the at least one measuring tube,
    $A_F$ is the cross sectional area of a fluid flowing in the at least one measuring tube, and
    $\rho_F$ is the density of the fluid flowing in the at least one measuring tube.

7. The method as claimed in claim 1, wherein:
    for the step of registering, the oscillatory system is excited at an excitation frequency by the at least one exciter and the excitation input variable associated with this excitation frequency, as well as the response variable occurring at this excitation frequency, for the oscillatory system are registered.

8. The method as claimed in claim 7, wherein:
    the excitation frequency corresponds to the resonance frequency of an excited oscillation mode, especially the fundamental mode of a bending oscillation.

9. The method as claimed in claim 8, wherein:
    the transfer equation has the component, $$h = \frac{Q F_D}{a X_S},$$

wherein h is the tube wall thickness of the at least one measuring tube,
    $F_D$ is an excitation force exerted by the at least one exciter on the oscillatory system and forms an excitation input variable,
    Q is a quality factor, which describes the decay behavior of the oscillations of the oscillatory system in the case of a one time exciting,
    $X_S$ is an amplitude of the oscillations of the oscillatory system caused by the exciter and forms a response variable, and
    a is a material, and geometry, dependent constant of the at least one measuring tube.

10. The method as claimed in claim 7, wherein:
the excitation frequency deviates from the resonance frequency of an excited oscillation mode, especially the fundamental mode of a bending oscillation.

11. The method as claimed in claim 10, wherein:
the transfer equation has the component, $$h = \frac{F_D}{aX_S\left(1 - \frac{\omega^2}{\omega_0^2}\right)},$$

wherein h is the tube wall thickness of the at least one measuring tube, $F_D$ is an excitation force exerted by the at least one exciter on the oscillatory system and forms an excitation input variable, $X_S$ is an amplitude of the oscillations of the oscillatory system caused by the exciter and forms a response variable, a is a material, and geometry, dependent constant of the at least one measuring tube, $\omega_0$ is the resonance frequency of the excited oscillation mode, and $\omega$ is the excitation frequency of the oscillatory system.

12. The method as claimed in claim 1, further comprising:
registering said at least one excitation input variable of the at least one exciter and said at least one response variable of oscillations of the oscillatory system and determining said tube wall thickness in parallel with a flow measurement performed with the Coriolis, flow measuring device for ascertaining a physical, measured variable, especially a mass flow, a viscosity and/or a density of a fluid flowing through at least one measuring tube.

13. The method as claimed in claim 1, further comprising:
registering said at least one excitation input variable of the at least one exciter and said t least one response variable of oscillations of the oscillatory system and determining said tube wall thickness if said at least one measuring tube is empty.

14. The method as claimed in claim 1, wherein:
in the step of determining the tube wall thickness of the at least one measuring tube, a temperature compensation and/or a pressure compensation are/is performed.

15. A Coriolis, flow measuring device, comprising:
an oscillatory system, which includes at least one measuring tube;
at least one exciter adapted to execute mechanical oscillations; and
at least one oscillation sensor adapted to register mechanical oscillations of said oscillatory system;
an electronics for registering at least one excitation input variable of the at least one exciter and at least one response variable of oscillations of the oscillatory system caused thereby, wherein:
the electronics is adapted to ascertain a tube wall thickness of the at least one measuring tube is ascertainable by inserting said excitation input variable and said response variable into a transfer equation,
said transfer equation relating to one another the tube wall thickness of said measuring tube which enters in a bending force acting on the oscillatory system the excitation input variable and the response variable.

* * * * *